United States Patent [19]

Cave

[11] Patent Number: 4,599,493
[45] Date of Patent: Jul. 8, 1986

[54] MULTI-LINE TELEPHONE CONTROL SYSTEM

[75] Inventor: Ellis K. Cave, Garland, Tex.

[73] Assignee: TBS International, Inc., Richardson, Tex.

[21] Appl. No.: 644,971

[22] Filed: Aug. 28, 1984

[51] Int. Cl.⁴ .............................................. H04M 3/46
[52] U.S. Cl. ............................ 179/18 FH; 179/18 BA
[58] Field of Search .............. 179/18 B, 18 FH, 6.02, 179/6.17, 18 BA, 90 BD, 90 B, 2 DP

[56] References Cited

U.S. PATENT DOCUMENTS

| | | | |
|---|---|---|---|
| 3,989,899 | 11/1976 | Norwich | 179/2 DP |
| 4,201,896 | 5/1980 | Bower et al. | 179/18 B |
| 4,438,296 | 3/1984 | Smith | 179/6.02 |

Primary Examiner—Thomas W. Brown
Attorney, Agent, or Firm—Richards, Harris, Medlock & Andrews

[57] ABSTRACT

An automated telephone calling system receives a group of telephone numbers from a host computer. For each telephone number there is a corresponding record of unique information. The host computer is connected to drive a plurality of operator display terminals. Each number is automatically called and equipment provides detection of rings, busy signals, recordings and voice answers. When a party answers a call, the called line is connected to a non-busy one of a group of operations. At the same time a report is sent from a central controller to the host computer reporting which number has been successfully called and which operator has been selected for the audio connection. The host computer then calls up the record for the called number and transmits at least a portion of the record to the display for the selected operator. The operator is thus provided with an audio connection to the called party as well as a screen display of relevant information for that party. When all the operators are busy the called parties are placed on hold until an operator is free. The operators are thus provided with a continuous sequence of answered calls for optimum utilization of the operators's time.

6 Claims, 2 Drawing Figures

MULTI-LINE TELEPHONE CONTROL SYSTEM

TECHNICAL FIELD

The present invention pertains in general to telephone and computer technology and in particular to the automated dialing of a large group of telephone numbers for operator communication.

BACKGROUND OF THE INVENTION

Many types of businesses, political and charitable activities require extensive telephone contact with a very large number of people. It is been found that an individual operator working to place calls with a coventional telephone can make successful contacts only at a relatively slow rate. For a substantial percentage of the calls that are placed the phones are either busy or there is no answer. Thus, a large part of the operator's time is spent on nonproductive work. A number of devices have been developed to aid an operator or to automate the calling process. Such devices are shown, for example, in U.S. Pat. Nos. 4,001,508, 3,999,017, 3,445,601, 3,274,346, 3,943,289, 4,160,125, 4,201,896, 4,438,296, 3,072,746, 3,989,899 and 3,407,269.

These pre-existing devices typically provide automatic dialing of a predetermined group of numbers. However, this still leaves a substantial workload for the operator in addition to the truly productive time which is the actual conversation with the called party. When particular information is required in regard to the called party, such as in debt collection services, the operator must have a substantial amount of information concerning the party. The storage and physical handling of a large bulk of such information is wasteful of operator productivity.

In view of the requirements for large volume dialing with operator contact and maximum operator utilization, there is a need for a method and apparatus to provide operators with fully connected calls together with the required file information for a called party in such a rapid and flexible manner that a large number of operators can be kept busy at the most productive tasks in telephone calls.

BRIEF SUMMARY OF THE INVENTION

A selected embodiment of the present invention comprises a method for providing a continuous sequence of telephone calls to a plurality of operators, each having a display terminal and a bidirectional audio communications device. A plurality of records are stored in a host computer which drives the display terminals. Each of the records includes a telephone number and other relevant information for a called party. A first step comprises transferring a plurality of stored telephone messages from the host computer to a controller. Each of the telephone numbers is dialed in sequence on an available one of a plurality of telephone lines in response to the controller. The number of telephone lines is typically greater than the number of operators. After the dialing of each number, a line condition is detected for other than a busy or ring to indicate an answer. For each answer the telephone line is connected to the communications device for a non-busy one of the operators. Further for each answer a status message containing the answered number and the operator connected is sent to the host computer. In response to the transferred identification of the answered number and the one operator, there is transmitted by the host computer at least a part of the stored record, which corresponds to the answered telephone number, to a display device for the one operator. Information from the record is displayed to the one operator concurrent with the one operator having audio communication through the answered line. The one operator is designated as busy until completion of the telephone call on the answered line. The described process is repeated until all of the operators are busy and then answered calls are placed on hold.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
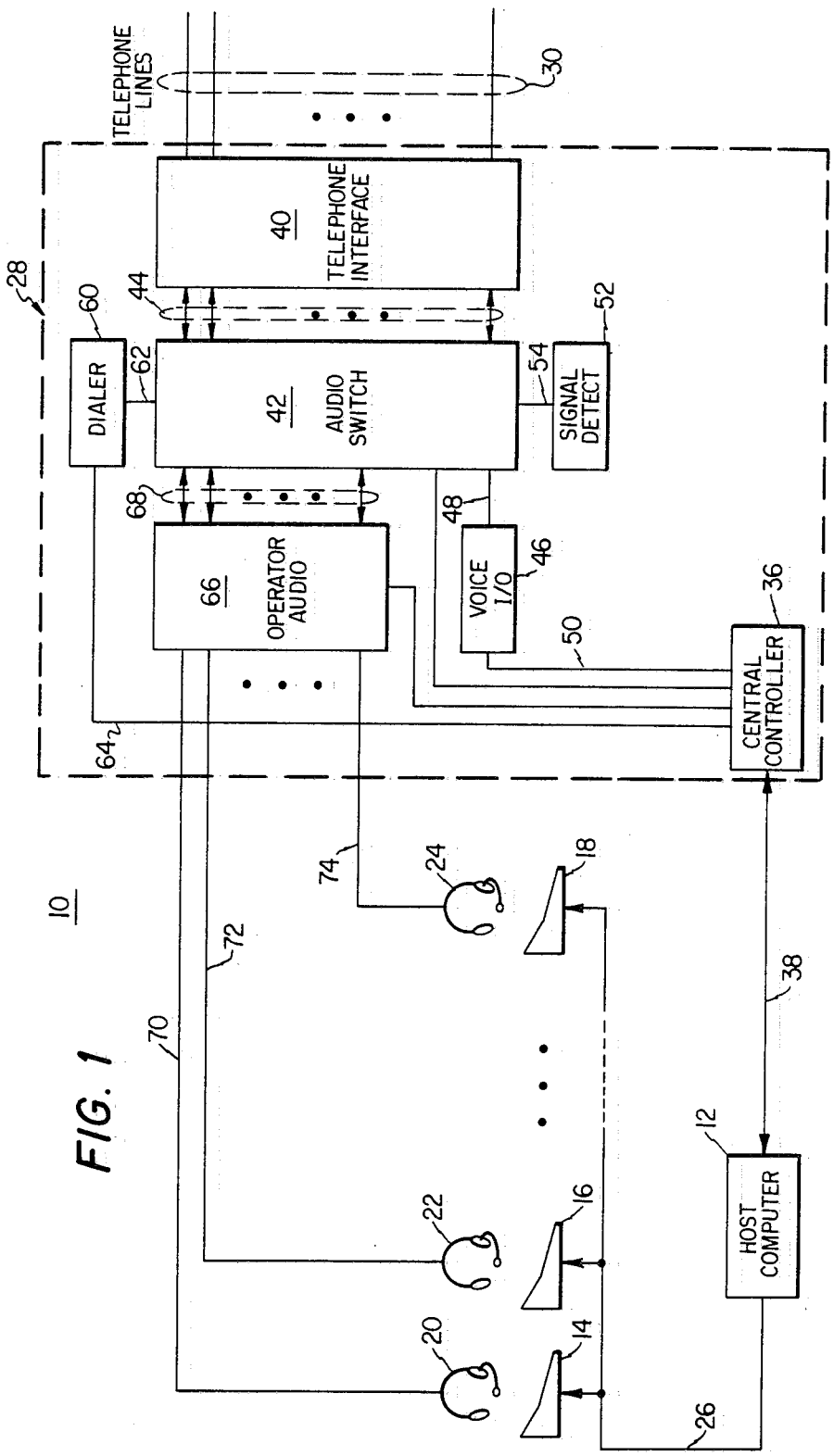
FIG. 1 is a block diagram illustrating equipment for use in operation of a multi-line telephone control system in accordance with the present invention.

The apparatus for carrying out the present invention is now described in reference to FIG. 1. A multiple operator telephone calling system 10 includes a host computer 12, a plurality of operator display terminals 14, 16 and 18 having respective headsets 20, 22 and 24. The headsets provide bidirectional audio communication. The computer 12 communicates with the display terminals 14, 16 and 18 through a communication line 26. The system 10 further includes a multi-line telephone control system 28 which is connected to a plurality of telephone lines 30.

The control system 28 includes a central controller 36 which is connected through a bidirectional communication line 38 to the host computer 12. A telephone interface 40 is connected to the telephone lines 30. An audio switch 42 is connected to a plurality of bidirectional audio lines 44 to the telephone interface 40. A voice I/O 46 is connected through a line 48 to the audio switch 42 and through a line 50 to the central controller 36. A signal detect circuit 52 is connected through a line 54 to the audio switch 42. A dialer 60 is connected through a line 62 to the audio switch 42 and through a line 64 to the central controller 36. An operator audio 66 is connected through a group of bidirectional audio lines 68 to the audio switch 42 and through lines 70, 72 and 74 respectively to the headsets 20, 22 and 24.

The host computer 12 is, for example, a Wang VS100, the terminals 14, 16 and 18 are each VISUAL 50 ASCII terminals manufactured by Visual Technology, Inc., and the headsets 20, 22 and 24 are model ACS 10030 type headsets manufactured by ACS Communications Co.

The control system 28 includes the controller 36 which can be a Compupro 68000 computer, the signal detect circuit 52 is a TBS, International disconnect detect circuit as shown in U.S. Pat. No. 4,156,799 and TBS international call progress detect circuit as shown in U.S. Pat. No. 4,405,833 and the voice I/O 46 is a VOTAN Inc. VMS voice management system. The units comprising the telephone interface 40, audio switch 42, dialer 60 and operator audio 66 are contained in the Modular Switching Peripheral device available from REDCOM LABORATORIES Inc.

The system 10 shown in FIG. 1 serves to automatically make telephone connections through lines 30 for providing dialing and eliminating busy and unanswered signals. The connected calls are provided to the operators at the terminals 14, 16 and 18. In a typical application the system 10 has approximately twice the number of telephone lines 30 as the number of operators.

The central controller 36 directs the operation of the multi-line control system 28 to make successful calls through the lines 30 and connect these calls to the appropriate ones to the operators through terminals 14, 16 and 18. When a call is successfully made, a non-busy operator is selected and the operator's headset is connected to the called line. The controller 36 then transmits an identification of the call and the selected operator to the host computer 12 which calls up a relevant display screen of information for the called party and directs it to the appropriate one of the display terminals 14, 16 and 18 for the selected operator. Thus, the operator is provided with an audio connection to a called party through one of the headsets 20, 22 and 24 and has displayed on one of the terminals 14, 16 and 18 detailed information concerning the called party. The operator's time is not consumed with the dialing of telephone numbers and the resulting time lost with busy lines and unanswered lines. There is further no time lost while the operator makes her request for display information following a successful connection to a called party.

The host computer 12 stores a record for each party to be called. This record includes a telephone number and additional relevant information for that party. The telephone numbers are transmitted as groups through the line 38 to the controller 36. When a called party answers, the host computer receives an indication of the successful connection from the controller 36. The host computer 12 then selects the corresponding relevant information and transmits it to the appropriate one of the display terminals.

Figure 2:
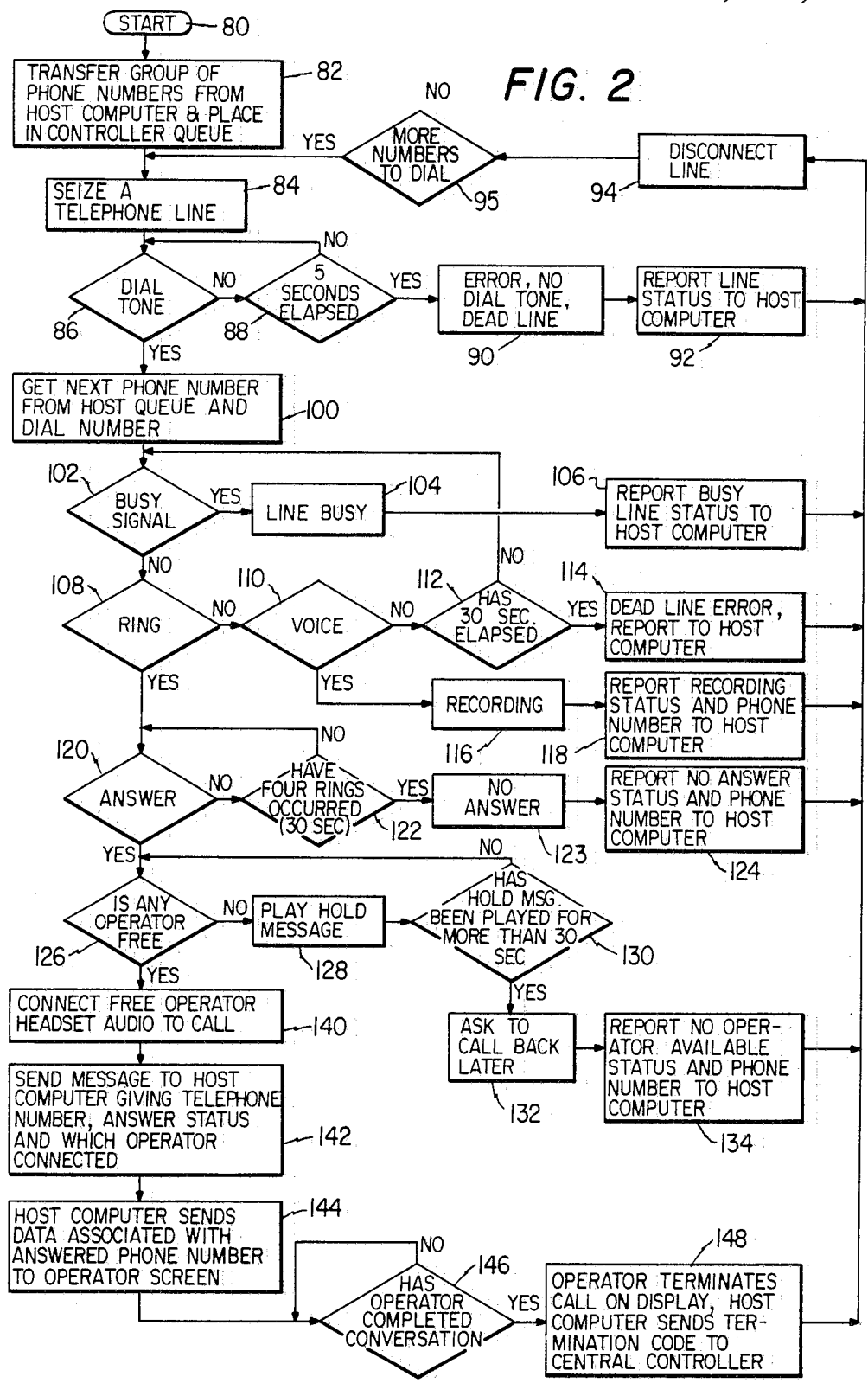
FIG. 2 is a functional flow diagram describing the call placement procedure and operations for the system illustrated in FIG. 1.

The detailed operation of the central controller 36 is now described in reference to FIG. 2. The operational description in FIG. 2 is described in reference to a single one of the telephone lines 30. This functional operation is carried out concurrently for each one of the telephone lines 30. The operation begins at a start point 80. In a first operational block 82 there is a transfer of a group of telephone numbers from the host computer 12 to the controller 36. These telephone numbers are placed in a host queue. In a sequential operational block 84, one of the telephone lines 30 is seized for placing a call. From the block 84 control goes to a decision block 86 to detect a dial tone on the selected line. If no dial tone is detected a decision block 88 is entered to determine if five seconds have elapsed since looking for dial tone began. If the five seconds has not elapsed the control is returned through a NO line to the input of the decision block 86. After five seconds has elapsed with no dial tone, control is transferred through a YES line to an operational block 90 which indicates that there is an error due to no dial tone, meaning that the line is dead. In the next operational block 92 a report is made by the controller 36 for the selected line to the host computer 12. From block 92 control is transferred to a disconnect line operational block 94 which disconnects the interface 40 from the selected line and returns control to the operational block 84 to seize a new telephone line and start a new dialing sequence.

If a dial tone is detected at decision block 86, control is transferred through the YES line to an operational block 100 which selects the next phone number from the host queue and dials this number at the selected line. From operational block 100 control enters a decision block 102, which examines the line for a busy signal. This operation is carried out by the signal detect circuit 52. If a busy signal is detected at block 102, control is transferred through the YES line to an operational block 104 to indicate a busy line. From block 104 control is transferred to an operational block 106 to report the busy line status to the host computer 12. Control is then transferred back to block 94 to disconnect the line and resume the call sequence at block 84.

If a busy signal is not detected at the decision block 102, control is transferred through the NO line to a decision block 108 for detection of a ring. If a ring is not detected, control is transferred through the NO line to a decision block 110 for detection of voice. A voice signal is detected through the selected line by operation of the signal detect circuit 52. If a voice is not detected on the called line, control is transferred through the NO line to a decision block 112 to determine if thirty seconds has elapsed since the call has been placed. If thirty seconds has not elapsed, control is transferred through the NO line and back to the decision block 102 for further examination of the line for detection of a busy signal. If thirty seconds has elapsed, control is transferred through the YES line to an operational block 114 which determines that there is a dead line error and an appropriate report is sent to the host computer 12. From block 114 control is transferred to the disconnect line block 94 to resume the calling sequence with a new number starting with block 84.

If a voice is detected at block 110 then, most likely, there is a recording being played on the line since there was never a ring. Control is transferred through the YES response to an operational block 116 for indicating detection of a recording. Control is next transferred to an operational block 118 to report the phone number and a recording status to the host computer 12. From block 118 control is passed to block 94 for line disconnect then to block 94 to start a new call sequence.

If the ring detection at decision block 108 indicates that there is a ring, control is transferred through the YES line to a decision block 120 for detection of an answer at the called line. Voice detection is carried out by the signal detect circuit 52. If there is no answer, control is transferred through the NO line to a decision block 122 to determine if four rings have occurred or if thirty seconds has elapsed. If this has not occurred, control is transferred through the NO line to reenter the examination for an answer at decision block 120. If the four rings or thirty seconds has occurred, control is transferred through the YES line to an operational block 123 to indicate no answer and then to an operational block 124 to report the status and phone number to the host computer 12 for the number that has been called but for which there has been no answer. Control is subsequently returned to the disconnect line block 94 for initiating another call sequence at the block 84.

If an answer is detected at the decision block 120, control is transferred through the YES response to a decision block 126 to determine if there is a free operator, that is, an operator not currently connected to a successfully placed call. If it is determined that there is no free operator, control is transferred through the NO response to an operational block 128 to play a hold message on the called line. This is carried out by the voice I/O 46. The message requests that the called party hold for a brief period until an operator is available. From block 128 control is transferred to a decision block 130 which examines to determine if the hold message has been playing for more than thirty seconds. If it has not, control is transferred through the NO response to the input of the decision block 126 to determine again if there is an operator available to service the called line. If the hold message has been playing for more than thirty seconds, control is transferred through the YES response to an operational block 132 which plays a recorded message to the called party stating that the party will be called at a later time. From block 132 control is transferred to an operational block 134 which reports the status and the phone number to host computer 12 for the number of the party who was called but who was told that a call will be placed at a later time. From block 134 control is then returned to the operational block 94 to disconnect the line and resume the calling sequence of block 84.

If the decision block 126 determines that there is a free operator to service the answered call, control is transferred through the YES response to an operational block 140 which connects a free operator through the operator audio 66 to the called line which has been answered. In the next operational block 142, the controller 36 sends a message to the host computer 12 giving the telephone number which has been answered and the identification of the operator which has the corresponding audio headset connected to the called line.

The next operational block 144 is carried out by host computer 12 rather than the controller 36. The computer 12 calls up at least a portion of the record for the called line which has been answered. The selected portion of the record is then sent through line 26 to the appropriate one of the terminals 14, 16 or 18 which corresponds to the operator whose headset has been connected to the called line. The operator is thus provided with a display screen of information that is uniquely relevant to the called party. The operator can then follow the sequence of information on the screen for communicating with the called party. The operator can directly enter responses from the called party into the displayed record which then can be returned to the host computer 12 for storage and further processing.

From the operational block 144 control is transferred to a decision block 146 which examines the display terminal for the selected operator to determine if the operator has completed the conversation with the called party. If the operator has not indicated that the conversation is completed, the NO response transfers control back to the input of the decision block 146 to further examine if the call has been terminated. When the operator has indicated that the call has been completed, control is transferred through the YES response to an operational block 148 in which the host computer receives the termination signal from the operator and in turn transmits a report of termination specifying which operator or telephone number has completed the conversation and this information is transmitted to the controller 36. Blocks 146 and 148 are carried out by the host computer 12. From the operational block 148 control is then returned to the disconnect line block 94 for releasing the line for which the conversation has been completed. Control is then returned to the operational block 84 for initiating another call sequence with a new telephone line.

When the group of telephone numbers received from the host computer 12 has been exhausted, the central controller 36 can request a new group of telephone numbers to be called and establish a new host queue for continuing the calling operation. The busy and unanswered numbers can either be retried by the central controller 36 or be included in a new group of numbers to be called by the host computer 12.

The system 10 provides optium utilization of the pool of operators by queuing called parties by operation of the hold message provided through operational block 128. In an optimal situation all of the operators remain busy while the called parties are on hold for a minimum time. Should the number of persons who receive a message for a later callback or the hold time becomes excessive, the control system 28 reduces the rate of calls by either pausing between calls or stop calling on a line. This brings the number of answered calls closer in line with the availability of operators. But if there are a number of free operators available without answered lines for servicing, the control system 28 increases the number of calls by increasing the number of phone lines or reducing the pause between outgoing calls to supply answered lines for servicing by all of the available operators.

In summary, the present invention comprises a multi-line calling system for automatically placing calls and eliminating the operator effort with busy and unanswered numbers. The successfully placed calls are reported to the host computer which produces a visual display to the operator who has received an audio connection to the successfully called party. The operator can then provide unique servicing to the called party.

Although one embodiment of the invention has been illustrated in the accompanying drawings and described in the foregoing Detailed Description, it will be understood that the invention is not limited to the embodiment disclosed, but is capable of numerous rearrangements, modifications and substitutions of parts and elements without departing from the scope of the invention.

What I claim is:

1. A method for providing a continuous sequence of telephone calls to a plurality of operators each having a display terminal and a bidirectional audio communications device wherein a plurality of records are stored in a host computer which drives the display terminals, each of the records including a telephone number and other information, comprising the steps of:
    (a) transferring a plurality of stored telephone numbers from said host computer to a controller,
    (b) placing each of a plurality of calls by dialing one of said numbers on an available one of a plurality of telephone lines in response to said controller,
    (c) after the dialing of said one number, detecting a line condition other than busy or ring to indicate an answer to the call,
    (d) for each call answer, connecting the answered one of the telephone lines to the audio communications device for a non-busy one of said operators,
    (e) for each call answer, transferring an identification of the number at which the call was answered and the one operator having the connected line to said host computer,
    (f) in response to said transferred identification of said number at which the call was answered and said one operator, said host computer transmits at least a part of the stored record corresponding to the telephone number for the answered call to the display device for said one operator whereby information from said record is displayed to said one operator concurrent with said one operator having audio communication through said answered line, said one operator thereby being designated as busy until completion of the telephone call on the answered line, and (g) repeating steps (b) through (f) attempting to keep all of said operators busy.

2. The method recited in claim 1 further including the step of placing said answered telephone lines on hold when there are no non-busy operators available to be connected to an answered telephone line.

3. The method recited in claim 1 wherein the number of said telephone lines is selected to be greater than the number of said operators.

4. A method for providing a continuous sequence of telephone calls to a plurality of operators each having a display terminal and a bidirectional audio communications device wherein a plurality of records are stored in a host computer which drives the display terminals, each of the records including a telephone number and other information, comprising the steps of:

(a) receiving a plurality of stored telephone numbers from said host computer by a controller, and placing said telephone numbers in a host queue, (b) in response to said controller, dialing one number from said host queue of numbers on one of a plurality of telephone lines, (c) after said dialing, detecting a line condition other than busy or ring to indicate an answer for the called number, (d) for an answer for said called number, connecting the one line to the communications device for a non-busy one of said operators, (e) following said answer, transferring by said controller an identification of said number at which the call was answered and of said one operator to said host computer, (f) in response to said transferred identification, said host computer transferring at least a part of the record corresponding to the number at which the call was answered to the display terminal for the one operator whereby information from said record is displayed concurrently with said one operator having audio communications through said answered line, (g) receiving at said controller an indication that said one operator has terminated a conversation through said answered line, and (h) disconnecting said answered line upon receipt of said termination indication.

5. The method recited in claim 4 further including the step of placing said answered telephone lines on hold when there are no non-busy operators available to be connected to an answered telephone line.

6. The method recited in claim 4 further including the step of reporting to said host computer, together with the dialed telephone number, line conditions other than answer.

* * * * *